Figure 1:
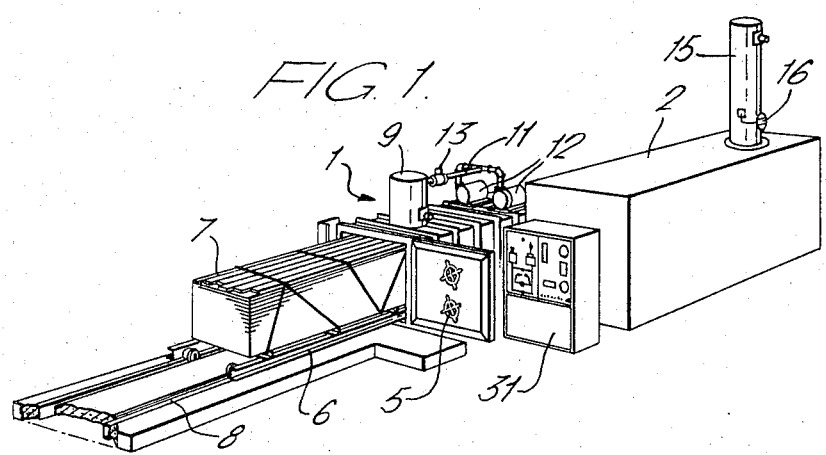

United States Patent [19]
Hurst et al.

[11] 3,859,046
[45] Jan. 7, 1975

[54] APPARATUS AND PROCESS FOR THE TREATMENT OF TIMBER

[75] Inventors: Robert Gillander Hurst; Alan Leonard Pinner, both of High Wycombe; Colin Trevor Kyte, Marlow, all of England

[73] Assignee: Fosroc A.G., Zug, Switzerland

[22] Filed: Aug. 21, 1972

[21] Appl. No.: 282,513

[30] Foreign Application Priority Data
Aug. 23, 1971  Great Britain .................... 39456/71

[52] U.S. Cl............................ 21/65, 21/7, 117/116, 118/50
[51] Int. Cl.............................................. B27k 3/10
[58] Field of Search ........ 21/7, 65, 63, 66; 117/116, 117/59; 118/50; 137/14

[56] References Cited
UNITED STATES PATENTS

| | | | |
|---|---|---|---|
| 1,197,997 | 9/1916 | Barry...................... | 117/59 |
| 2,334,586 | 11/1943 | Shipley.................... | 21/65 |
| 3,200,003 | 8/1965 | Bescher................... | 21/65 X |
| 3,233,579 | 2/1966 | Arvidsson............... | 118/50 |
| 3,467,546 | 9/1969 | Page et al............... | 117/116 |

*Primary Examiner*—Joseph Scovronek
*Assistant Examiner*—Timothy W. Hagan
*Attorney, Agent, or Firm*—Caesar, Rivise, Bernstein & Cohen

[57] ABSTRACT

A method and apparatus for the impregnation of timber with a preservative liquid under pressure. The apparatus comprises a vessel for storing the preservative liquid and a vessel for the timber. Pump means are provided for directly transferring the liquid between the vessels. The storage vessel has an upwardly extending portion of relatively smaller cross sectional area which is open to the atmosphere, includes a hydrostatic pressure gauge and means for measuring the level of liquid in the storage vessel. The timber vessel has at its upper end an expansion chamber into which the liquid flows when the timber vessel is full of liquid and has at its lower end a chamber into which the liquid flows when being returned to the storage vessel. Each of the chambers are 8 relatively smaller cross sectional area than the timber vessel. Float switches are provided in the chambers. The apparatus also includes an oscillating pump for accurately drawing a partial vacuum in the timber vessel only, to extract the moisture and air from the timber disposed therein prior to the introduction of the preservative liquid therein. Pumps are provided for thereafter directly transferring the preservative liquid to the timber vessel to completely fill the vessel whereupon some of the liquid enters the expansion chamber. Means are provided for increasing the pressure within the timber vessel after the vessel is full of preservative liquid to cause the liquid to impregnate the timber. A bulk storage vessel is provided and connected to the storage vessel as well as the timber vessel.

8 Claims, 3 Drawing Figures

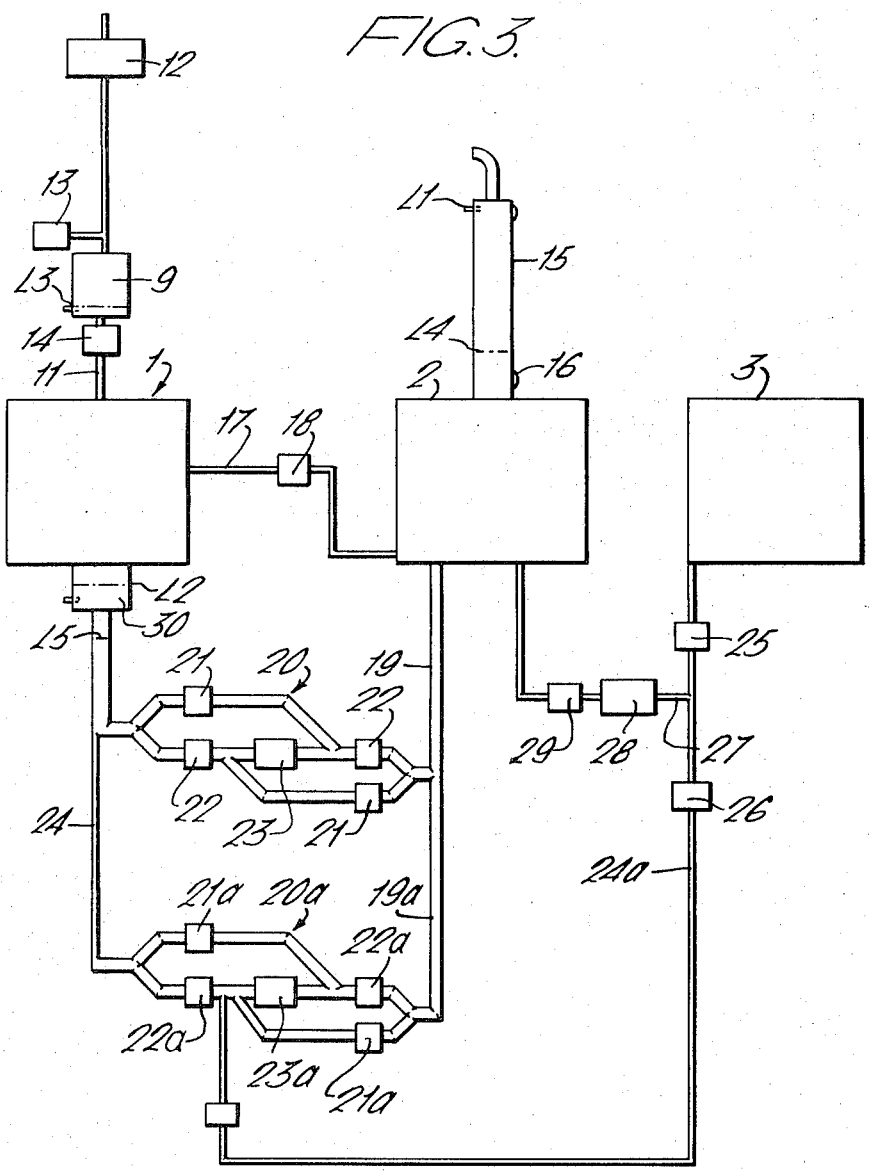

APPARATUS AND PROCESS FOR THE TREATMENT OF TIMBER

The invention relates to the treatment of timber using apparatus and a method in which a preservative liquid is forced under pressure into the timber. Such a preservative liquid typically comprises a fungicide e.g., pentachlorphenol and tributyl tin oxide or an insecticide e.g., gammabenzene hexachloride or a fire retardant in an organic solvent. Because it is difficult to control the amount of liquid forced into the timber it is usual to first apply too much and then remove the excess.

According to the invention, apparatus for the purpose specified comprises a vessel for the timber and a storage vessel for the preservative, means for directly transferring liquid between the vessels; means for drawing a partial vacuum in the timber vessel only, in which each vessel has a portion of restricted volume.

In the case of the storage vessel the portion of restricted volume is preferably a measuring chimney having a hydrostatic gauge to indicate the pressure of liquid while the timber vessel preferably has two such portions, one being an upper expansion vessel and the other a lower flow box. Most usefully, each restricted portion has a float switch or the like, movement of which is arranged to control the flow of liquid or drawing of a vacuum so that successive stages of treatment may take place automatically.

The partial vacuum is preferably drawn by an oscillating pump arranged to keep the vacuum at a predetermined level. Most preferably a time delay device controls the time for which the vacuum exists or the liquid is pressurised into the timber. Preferably the timer vessel is of substantially rectangular cross-sectional shape and has a sliding door so that a rail track can extend through the mouth of the timber vessel.

The invention includes a method of using apparatus as defined comprising loading timber in the timber vessel, applying a first partial vacuum to the timber vessel, supplying liquid to the timber vessel from the storage vessel while maintaining the partial vacuum, applying pressure to urge the liquid into the timber, emptying the timber vessel of the liquid, applying a second partial vacuum to the timber vessel and then releasing the timber vessel to the atmosphere.

Figure 2:
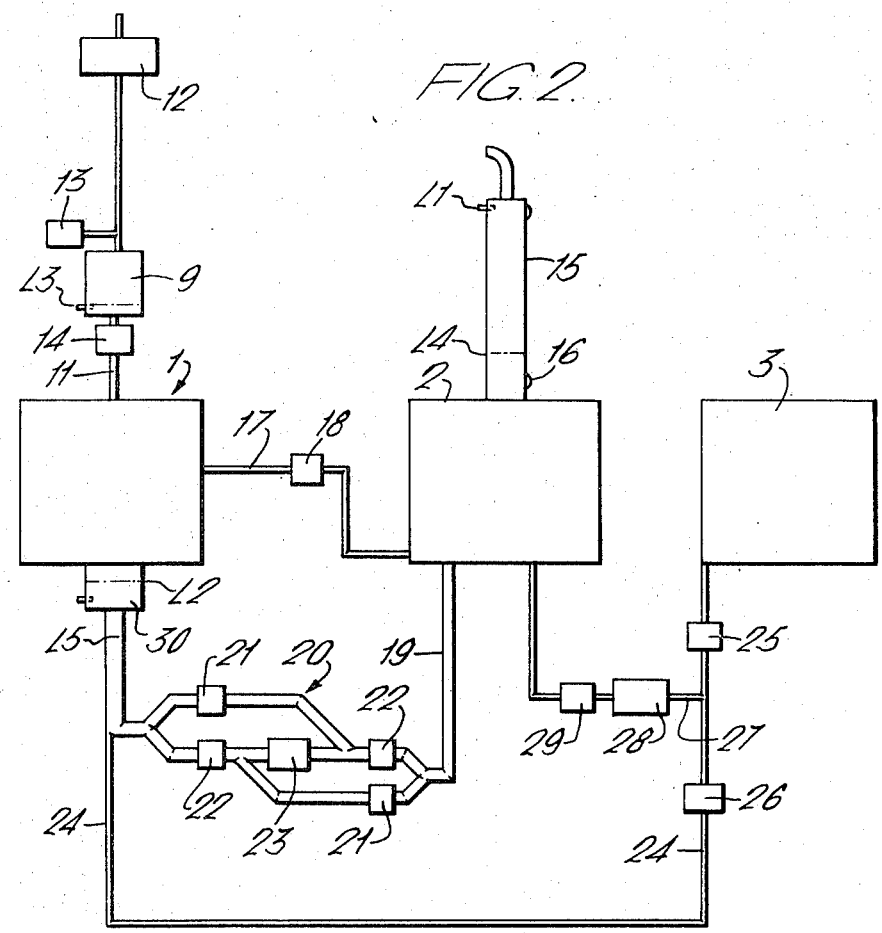

The invention is illustrated by the accompanying drawings in which:

FIGS. 1 and 2 are respectively a perspective view and schematic diagram of one apparatus, and FIG. 3 is a schematic diagram of another apparatus.

The apparatus of FIGS. 1 and 2 comprises a timber vessel 1 connected to a storage vessel 2, which is connected to a bulk storage vessel 3, FIG. 2.

The timber vessel 1 is made of steel plate walls and is of square cross sectional shape. Conveniently the vessel is made by building up units in tandem to a required length. At one end, the left hand as shown, the vessel has a door 4 suitably reinforced to withstand vacuum conditions. The door 4 is arranged to slide across the mouth of the vessel and there are seals between the door and the mouth of the vessel to prevent leakage of liquid when the door is locked into a closed position by capstan handwheels 5 or hydraulic rams, not shown.

The floor of the timber vessel has a bogie 6 on which a load of timber 7 may be secured. A rail track 8 is located within the vessel and immediately in front of the sliding door 4 so that the bogie can be fully withdrawn from the vessel. Because the door 4 can slide there is but a slight gap in the track. The roof of the vessel has an outlet 10, FIG. 2, communicating with an expansion vessel 9. The expansion vessel 9 communicates via a pipe 11 with a pair of vacuum pumps 12, each mounted on the roof of the vessel 1. These pumps are liquid ring type, each capable of maintaining a vacuum of the order of 635 to 700 mm mercury. A pneumatically operated valve 13 having polyfluoroethylene contact parts is interposed in the pipe 11 between the expansion vessel 9 and the vacuum pumps 12 and another such valve 14, FIG. 2, in the pipe 11, between the vessel and the timber vessel 1. The floor of the vessel 1 is connected via a drain pipe to a bottom flow box 30.

The storage vessel 2 is made of steel plate and is of square cross-sectional shape. The volume of the storage vessel is not less than that of the timber vessel 1. A measuring chimney 15 is mounted on the roof of the storage vessel 2 and at its foot the chimney communicates with the interior of the vessel while the top of the chimney is open to the atmosphere. A hydrostatic pressure gauge 16 is located adjacent the foot of the chimney 15 and is adapted to measure directly the pressure of liquid in the chimney. The chimney has an optical scale calibrated to indicate the volume of liquid therein expressed as gallons or litres.

A pipe 17 interconnects the storage vessel 2 and the timber vessel 1, a valve 18 being interposed in the pipe between the vessels. A further pipe 19 interconnects the two vessels, 1, 2 via a branch system 20 incorporating two sets of valves 21, 22 arranged separately to isolate an impellor type transfer pump 23. The pipe 19 communicates with a further pipe 24 which at one end communicates with the flow box 30 of the timber vessel 1 and which at the other end communicates with the bulk storage vessel 3. The pipe 24 has a pair of spaced valves, 25, 26, between which is a branch pipe 27 communicating with the storage vessel 2. The pipe 27 has a primer/scavenger pump 28 and a valve 29.

The console 31 incorporates an instrument panel having electrical controls for the valves and pumps previously described and also for magnetic type float switches, not shown, located in the flow box 30, the measuring chimney 15 and the expansion vessel 9. The console 31 incorporates a vacuum measuring device adapted to maintain a vacuum at a predetermined level and arranged to control the action of the vacuum pumps 12. One such device is a so-called Vac Stat marketed by Foster Cambridge Limited, Manchester, England, which has a pair of spaced electrical contacts connected in circuit with the pumps. One contact is preset to a required vacuum and the other is arranged to move with the vacuum drawn; when the second contact reaches the first the electrical circuit is broken and then the valve 14 closes. Any fall in the vacuum opens valve 14 to restore the vacuum to the required level. The Vac Stat instrument is also connected in electrical circuit with other instruments arranged to be actuated by a change in pressure level.

In use, a load of timber 7 is secured to the bogie 6 which is then rolled along the track 8 into the timber vessel 1. The door 4 is then slid into the closed position and the handwheels 5 turned to apply the pressure seals. The mode of treatment of the timber is then as follows:

Stage I

Establishing liquid levels

First a level of liquid should be established in the storage vessel 2 sufficient to reach level L1 in the chimney 15. This is done by opening valves 25, 29 and closing valve 26 and then actuating primer/scavenger pump 28 to transfer liquid from the bulk storage vessel 3 to the storage vessel 2. When the level L1 is reached, as indicated by a float-switch lighting up an alarm such as a warning light or bell on the console, the valves 25, 29 and the pump 28 are shut off by pressing a suitable control on the console 31. The level of liquid in the flow box 30 has reached the level L2 as a result of a previous cycle.

Stage II

Creating initial vacuum

The valve 14 is opened in response to movement of the float switch at the level L1 and actuates the pumps 12. These draw air from the treatment vessel 1 until a predetermined level of vacuum has been drawn. The level of vacuum depends on the type and condition of timber to be treated. The Vac Stat is set to the required level and controls the degree of vacuum drawn by the pumps 12 in the timber vessel 1. The valve 14 automatically opens and closes to maintain the vacuum at this predetermined level. The effect of the initial vacuum is to suck moisture and air from the timber to be treated.

Stage III

Filling the treatment vessel

When the predetermined partial vacuum has been drawn in the timber vessel 1 a signal generated by the Vac Stat causes the valves 21 to be opened and the pump 23 to start. The bulk of the liquid in the storage vessel 2 is then transferred to the timber vessel 1 until the level of liquid rises to the level L3 in the expansion vessel 9. The valves 13 and 14 are opened or closed by the Vac Stat instrument as and when required to maintain the predetermined partial vacuum in the timber vessel. At the end of this stage the timber vessel is full of liquid.

Stage IV

Absorption under pressure

When the flat switch in the expansion vessel 9 is moved in response to the rise of liquid to the level L3 an electrical signal closes all the valves and shuts off the pumps. As the system is then effectively closed the pressure differential urges the treatment liquid into the pores of the timber in the timber vessel. The valve 18 is open for this, and pressure is induced through the air vent at the top of the measuring chimney 15 forcing liquid into the timber in the vessel 1. The absorption is allowed to continue for a predetermined time controlled either manually or by a time delay relay.

Stage V

Emptying of timber vessel

At the end of the predetermined absorption time, the valve 18 is shut, the valves 13, 14 and 22 are opened and the transfer pump 23 is actuated. This draws liquid from the timber vessel 1 back into the storage vessel 2 until the level in the latter rises to the level L4. Drainage of the liquid from the timber vessel 1 causes the level in the flow box 30 to fall to the level L5 whereupon the float switch therein causes the pump 23 to be stopped and the valves 22 to be closed. Residual treatment liquid drains off the timber vessel walls so raising the level in the flow box 30 from L5 to L2 when the valves 25, 26 are opened and the primer/scavenger pump 28 started to recycle treatment liquid until the levels L2 and L4 are steady. The pump 28 is still running. The difference between the levels L1 and L4 in the measuring chimney 15 is the volume of liquid absorbed by the timber at this stage.

Stage VI

Creating final vacuum

When the float switch at level L2 in the flow box 30 first moves, the valve 14 is closed, valve 13 opened and the pumps 12 started. A vacuum is then drawn in the timber vessel 1 to a degree greater than that initially applied. Liquid over and above that required to treat the timber is drawn out of the timber and this raises the level in the flow box 30 above L2. This causes the valve 29 to be opened, and the primer/scavenger pump 28 still running from the previous stage, draws such excess liquid via pipe 24 into the storage vessel 2. A watch is kept on the measuring column 15 until the level rises to a value precalculated according to the absorption desired in the timber or this stage is controlled by a time delay relay.

Stage VII

Vacuum release

At the end of Stage VI, the valve 14 is opened and the pumps 12 stopped. The valve 13 is opened so allowing the pressure in the timber vessel 1 to revert to atmosphere. The door 4 is then unlocked and the treated timber is then removed; the system is immediately ready for reuse.

The embodiment of FIG. 3 is the same as that just described but an auxilary branch system is interposed between the pipes 19 and 24. For ease of reference the same numerals will be used with the letter *a*. The pipes 19*a* and 24*a* are further interconnected by a branch pipe 32 connecting the pipe 24*a* and that portion of the pipe 19 between the pump 23*a* and the valve 22*a* adjacent the timber vessel 1. The pipe 32 has a valve 33. The embodiment is operated the same way as that of FIG. 2 save that at Stage IV the valve 33 is opened and the pump 23*a* urges liquid towards the timber vessel to exert a positive pressure to increase the pressure differential better to force liquid into the timber. Using this embodiment a pressure difference may be generated.

We claim:

1. Apparatus for the impregnation of timber with preservative liquid under pressure, comprising a vessel for treating the timber, a storage vessel for preservative liquid, means for producing a vacuum in said timber vessel and transfer means for transferring liquid between the timber vessel and the storage vessel, the timber vessel communicating with first and second chambers, each of said chambers being of relatively smaller cross-sectional area than the timber vessel, the first chamber being located above the timber vessel to receive preservative liquid when the timber vessel is full and the second chamber being located below the timber vessel to effect the passage of preservative liquid between the timber vessel and the storage vessel, said first chamber including level sensing means, said vacuum means producing a predetermined vacuum in said timber vessel to suck air from the timber disposed within said timber vessel, said transfer means transferring liquid from the storage vessel to the timber vessel in automatic response to the attainment of a predetermined partial vacuum in said timber vessel, the liquid level sensing means in said first chamber causing the transfer of liquid from the storage vessel to the timber vessel to cease upon the attainment of the predetermined level of liquid in said first chamber, means for increasing the pressure within said timber vessel after said vessel is full of the preservative liquid, whereupon said liquid is forced into the timber by the pressure induced in said timber vessel, said transfer means thereafter transferring the remaining liquid from the timber vessel back to the storage vessel, said second chamber having first level sensing means causing the transfer of preservative liquid from the timber vessel to the storage vessel to cease in response to the attainment of a predetermined level of liquid in said second chamber, said storage vessel communicating at its upper end with a chimney of relatively smaller cross-sectional area, the chimney having first means for sensing an initial level of preservative liquid therein and second means for sending the final level of liquid, said vacuum means being responsive to the initial level of liquid in the chimney for drawing an initial vacuum in the timber vessel.

2. The apparatus of claim 1 in which said chimney includes a hydrostatic gauge to indicate the pressure of preservative liquid therein.

3. The apparatus of claim 1 wherein said second chamber also includes second liquid level sensing means for causing said vacuum means to produce a final vacuum in the timber vessel in response to attainment of a predetermined level of liquid in the second chamber.

4. The apparatus of claim 1 wherein the vacuum means comprises a oscillating pump arranged to draw and maintain a vacuum in the timber vessel.

5. The apparatus of claim 4 wherein said chimney is open to the atmosphere.

6. The apparatus of claim 1 including time delay means to control the period for which preservative liquid is disposed in the timber vessel.

7. The apparatus of claim 1 including time delay means to control the period for which a partial vacuum exists in the timber vessel.

8. The apparatus of claim 1 including a bulk storage vessel connected to the storage vessel and to the second chamber of the timber vessel to supply liquid to the timber vessel when the latter is filled with liquid from the storage vessel.

* * * * *